Sept. 16, 1958  A. E. WELCK  2,852,163
FERTILIZER DISTRIBUTOR
Filed Sept. 9, 1955  3 Sheets-Sheet 3
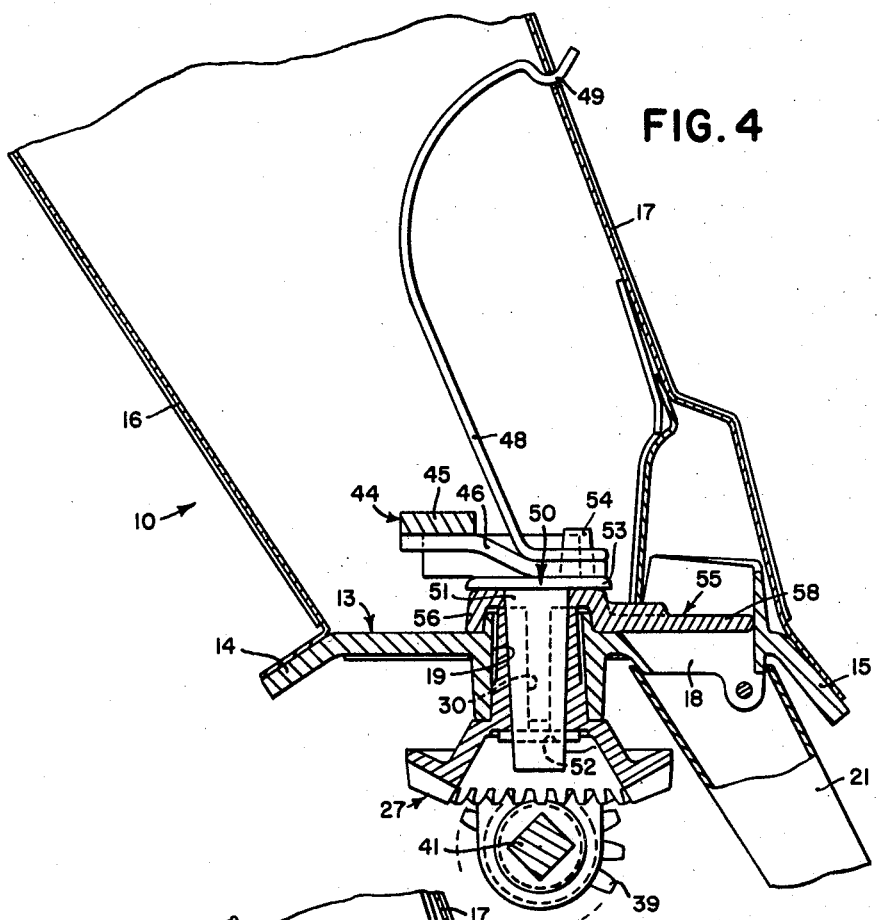
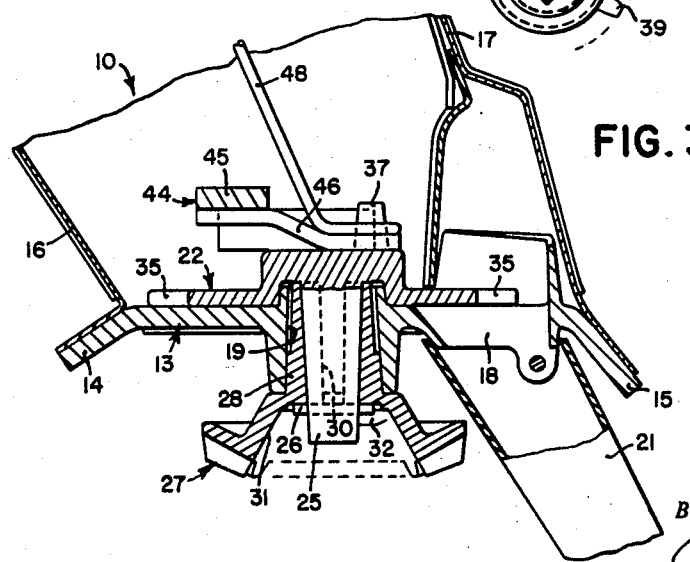
INVENTOR.
ARNOLD E. WELCK
BY
ATTORNEYS

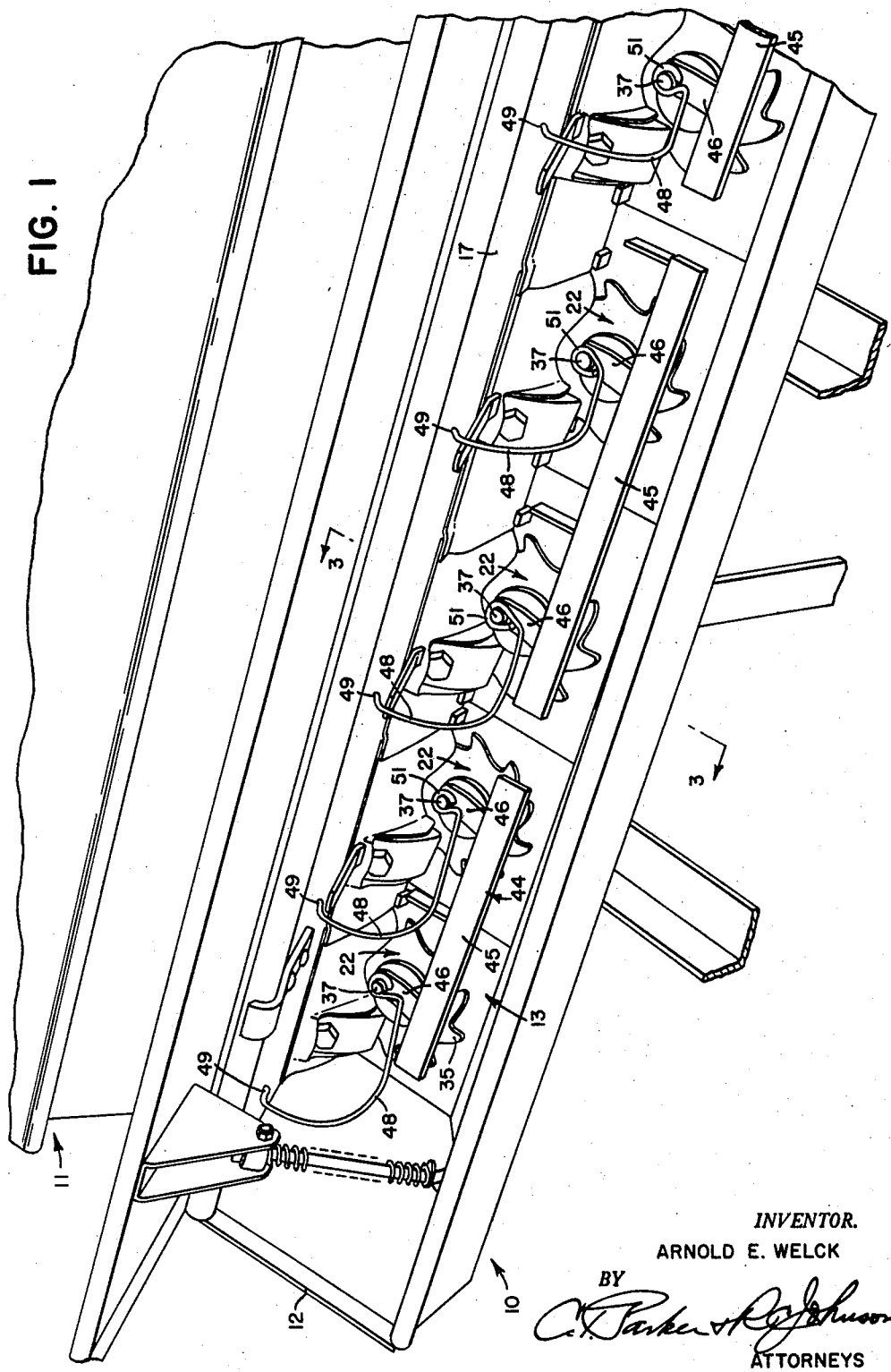

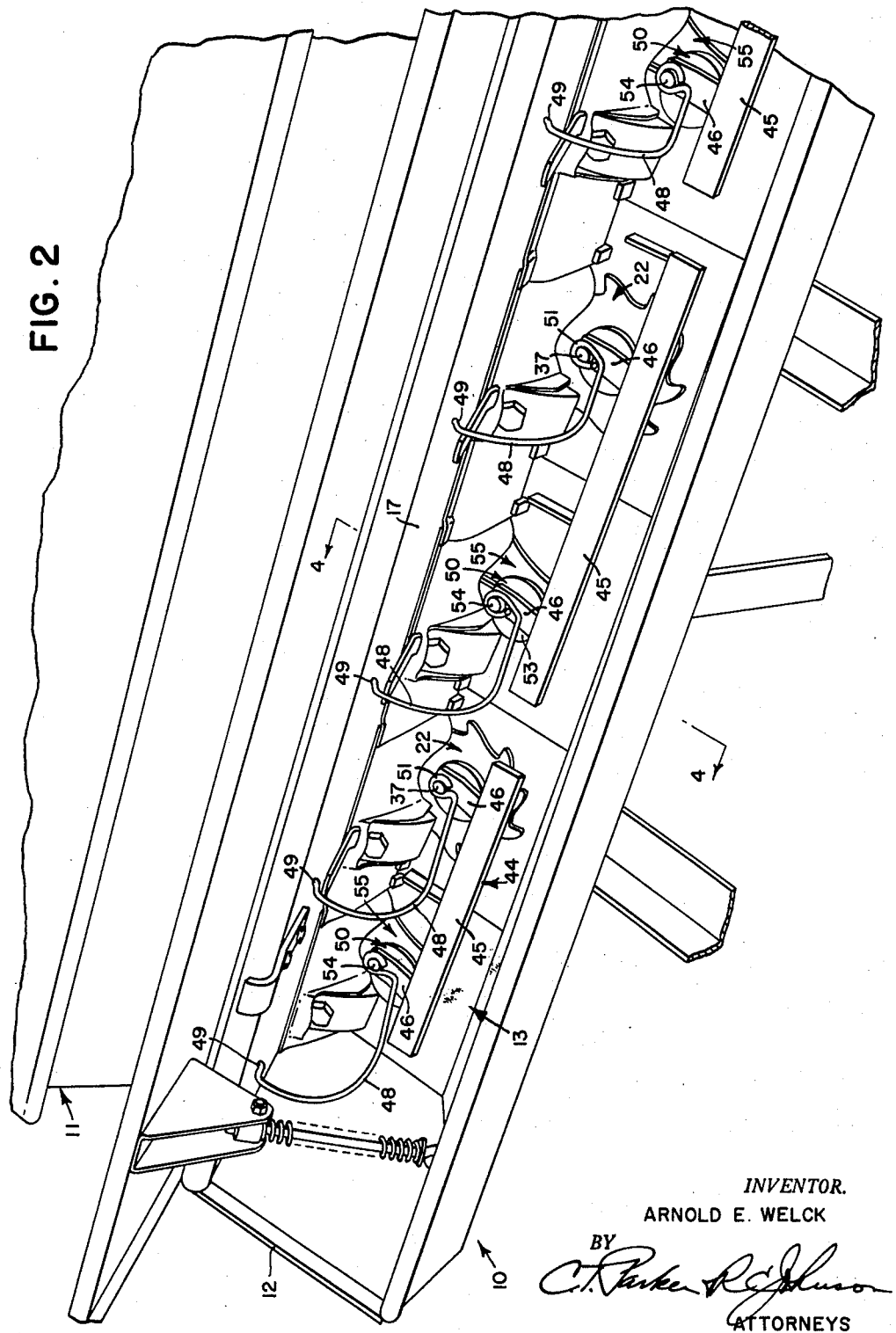

United States Patent Office 2,852,163
Patented Sept. 16, 1958

2,852,163

FERTILIZER DISTRIBUTOR

Arnold E. Welck, Horicon, Wis., assignor to John Deere Van Brunt Company, Horicon, Wis., a corporation of Wisconsin Application September 9, 1955, Serial No. 533,336

6 Claims. (Cl. 222—232)

The present invention relates generally to agricultural implements and more particularly to fertilizer distributors.

The object and general nature of the present invention is the provision of a new and improved agitator means for fertilizer distributors, but not necessarily limited to use with grain drills.

More specifically, it is a feature of this invention to provide a new and improved agitator mechanism for fertilizer distributors in which a plurality of feeder wheels are employed for distributing fertilizer in rows, with agitator means in the fertilizer hopper for breaking up lumps of hardened fertilizer and the like, and means connected with every other feed wheel for driving the agitator means, thereby reducing the load imposed on the feeder wheel means by virtue of the connection with the agitating mechanism, inasmuch as the stresses involved in driving the agitating mechanism are distributed among the several feed wheels.

It is a further feature of this invention to provide agitator driving means that can be substituted for certain of the feed wheels, which are removable, when it is desired to distribute the fertilizer in a smaller number of rows.

These and other objects and advantages of the present invention will be apparent to those skilled in the art after a consideration of the following detailed description, taken in conjunction with the accompanying drawings, in which:

Fig. 1 is a fragmentary perspective view looking downwardly into a fertilizer attachment for a grain drill, showing the agitating means of the present invention.

Fig. 2 is a perspective view, similar to Fig. 1, showing the fertilizer attachment with every other fertilizer distributing feed wheel removed and a drive stud substituted therefor, with associated connection with the agitating means.

Fig. 3 is a sectional view taken generally along the line 3—3 of Fig. 1.

Fig. 4 is a sectional view taken generally along the line 4—4 of Fig. 2.

Referring first to Fig. 1, the reference number 10 indicates, in its entirety, a fertliizer attachment for a grain drill, indicated at 11. The fertilizer attachment includes a hopper 12 comprising an elongated box or container having a generally flat bottom formed by a plurality of bottom plates 13 that per se are of generally conventional construction, each of which includes outwardly and downwardly extending sections 14 and 15 (Fig. 3) that are fastened in any suitable way to the side sheets 16 and 17 that form the principal portion of the hopper 12. Each bottom plate 13 is provided with a fertilizer discharge opening 18 and a feed wheel receiving opening 19. A fertilizer distributor of this general construction is usually employed to distribute fertilizer in spaced apart rows, there being a fertilizer discharge tube 21 associated with each of the discharge openings 18.

As best shown in Fig. 1, there is a feed wheel 22 disposed in each of the openings 19, each feed wheel including a depending shank section 25 (Fig. 3) apertured at its lower end to receive a drive pin 26. Associated with each feed wheel 22 is a drive gear 27 having a hollow shank section 28 telescopically associated with the shank portion 25 of the feed wheel 22, the shank 28 of the drive gear 27 being slotted, as at 30, to receive the drive pin 26. The lower portion of the gear 22 is open, as at 31, to permit the pin 26 to be passed down through the slotted portion 30 and rotated against the lower face of the drive gear to bring the pin against a pair of driving lugs 32, whereby a driving connection is established between the drive gear and the associated feed wheel and, in addition, providing for the support of the drive gear on the feed wheel.

The feed wheel 22 is provided with an upper star wheel section 35 that serves primarily to bring fertilizer material into the discharge opening 18, the star wheel section 35 lying against the upper face of the associated plate 13 and thereby supported upon the latter. An agitator bar driving projection 37 is disposed in eccentric relation with respect to the axis of rotation with the feed wheel 22 and gear 27 and serves to drive the associated agitator mechanism described below. Each gear 27 is driven by an associated pinion 39 supported on a drive shaft 41 that extends substantially the length of the hopper 12. The drive shaft 41 is removable endwise from the hopper and the pinions 39 are connected to the shaft 41 so as to be removable therefrom. By removing the pinions 39 and taking out the shaft 41, any one or all of the drive gears 27 may then be disconnected by rotating the latter relative to the associated feed wheel in a direction to bring the pins 26 into line with the slots 31, whereby the gear 27 may then drop away from the associated feed wheel 22.

Fertilizer feed wheel mechanism of this general type is shown in U. S. Patent 1,151,742, issued August 31, 1915, to Van Brunt et al.

As shown in Fig. 1, each of the bottom plates 13, forming a part of the hopper 12, is provided with a feed wheel construction as just described. The agitating mechanism associated with this type of construction will now be explained.

According to the principles of the present invention the agitating mechanism, indicated generally by the reference character 44, preferably takes the form of a plurality of short agitator bars 45, there being one bar for each two feed wheels 22, and the bars 45 are disposed generally in end to end alignment. Each of the bars 45 has an outwardly and downwardly extending attaching section 46 rigidly fixed to each end thereof, as by welding, and the outer end of each attaching section 46 is apertured to fit over the associated bar-driving projection 37 on the two feed wheels 22 associated with each bar. It will be seen from Fig. 1, that, for this purpose, the drive gears 27 and pinions 39 must be assembled in the proper timed relation to secure the proper reciprocation of the associated agitator bar 45, but such timed relation necessarily involves only two drive gears 27 and the associated pinions 39, although it is preferable that all of the gears be timed so that the agitator bars 45 will remain more or less in alignment longitudinally of the hopper. Each attaching section 46 of each agitator bar 45 is held in place on the associated driving projection 37 by a spring member 48, one end 49 of which is formed as a hook section and engages in an opening in the associated hopper side wall 17 while the lower end of each spring member 48 is formed with an eye 51 that encircles the associated projection 37 and overlies the associated attaching section 46 of the bar 45. Each feed wheel and associated agitating mechanism may readily be removed from the hopper by springing the members 48 out of position to remove them from the projections 37 on the associated feed wheels, and then lifting off the agitating bars and, if desired, lifting out the associated feed wheels 22.

One of the advantages of the present invention is that the load of driving the agitating means, considered as a whole, is distributed between all of the feed wheels 22. This arises, first, because the agitating means, considered as a whole, is connected with each and every one of the feed wheels 22, and second, because instead of a single long agitating bar, the agitator means includes a plurality of bar sections, each of which is connected with only two feed wheels, whereby each feed wheel necessarily drives its portion of the load of the agitating means.

Under some conditions, it is desirable to distribute the fertilizer in rows that are spaced farther apart than the distance between each pair of adjacent discharge tubes 21 in the form of the invention as illustrated in Fig. 1. To this end, I provide means whereby alternate feed wheels 22 may be removed from the hopper and the discharge opening associated therewith closed, whereby the fertilizer is distributed between only half as many rows as when the parts are arranged as shown in Fig. 1. Referring now to Figs. 2 and 4, for each removed feed wheel 22, I provide a drive stud 50 that is adapted to take the place of the removed feed wheel 22 so as to provide the required drive for the agitating means 44. To this end, each of the drive studs 50 is provided with a shank section 51 corresponding to the shank 25 on each feed wheel 22, the shank 51 having an opening 52 to receive the driven pin 26. The drive stud 50 includes a head section 53 that overlies the apertured section 56 of a feed stop 55, described below, and rising in eccentric relation from the head section 53 is an agitator drive projection 54 substantially identical dimensionally with the feed wheel projection 37.

Each of the feed wheels 22 is so arranged that the plane passing through the projection 37 and the vertical axis of rotation of the feed wheel also passes through the drive pin 26, and the same relation is provided in the drive stud 50. That is, the opening 52 in the shank 51 receiving the drive pin 26 lies in a plane that passes through the agitator drive projection 54 and the vertical axis of the stud 50. When the stud 50 is installed, the associated drive gear 27 and pinion 39 are assembled in substantially the same timed relation as described above, and the projection 54, being identical with the projection 37, receives the associated portion of the agitator bar 45, whereby the latter is driven exactly the same as if the two feed wheels were associated with each agitator bar. The arrangement shown in Figs. 2 and 4 has the advantage over that shown in Fig. 1 in that fertilizer that tends to harden and cake very rapidly can be handled because the drive stud 50, having no star wheel section, can be relied upon to take more of the load of driving the agitator mechanism than would be the case if the part 50 were also required to drive a fertilizer star wheel section.

Where the drive stud 50 is installed, it is also necessary to provide means for closing off the associated discharge opening 18 in the hopper bottom plate 13. To this end, I provide a cover or feed stop 55 in the form of a plate member having at one side an apertured section 56 through which the shank 51 of the associated drive stud is adapted to extend, the opening being slotted so as to accommodate the passage of the drive pin 26 therethrough. In addition, the feed stop or cover 55 is provided with a flat section 58 that, when the member 55 is installed, covers the associated discharge opening 18. The apertured portion 56 of the feed stop 55 lies underneath the head 53 of the associated drive stud 50, as best shown in Fig. 4.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a fertilizer distributor, an elongated hopper having a plurality of openings arranged in spaced apart relation and extending generally from one end of the hopper to the other end, a feed wheel rotatably disposed in each opening, each of said feed wheels having a bar-receiving part eccentrically mounted relative to the axis of rotation of the feed wheel, means connected with each feed wheel to drive said feed wheels simultaneously, and agitator means extending longitudinally of the hopper substantially from end to end thereof, said agitator means including a plurality of relatively short bar sections, each having at each end an apertured attaching section receiving the associated bar-receiving part, and a plurality of hold down springs connected to react at one end against the hopper and at the other end against the associated agitator bar attaching section, said other end of each of said springs having a portion encircling the associated bar receiving part.

2. In a fertilizer distributor, a hopper having a plurality of pairs of openings, a plurality of feed wheels rotatably mounted in alternate hopper openings, one in one opening of each pair of openings, a plurality of agitator drive studs rotatably mounted in the remaining hopper openings, one stud being disposed in the other opening of each pair, means connected with each feed wheel and each drive stud for driving them, an agitator bar extending from each feed wheel to the associated drive stud, each of said feed wheels and drive studs having an eccentrically disposed bar-driving part, a cover to close over each of the openings receiving said drive studs, and means on each end portion of each agitator bar to rotatably receive the associated bar-driving part.

3. In a fertilizer distributor, an elongated hopper having a bottom formed with a plurality of pairs of discharge openings, a drive shaft carried by said hopper and journaled in said hopper below the bottom of the latter, a plurality of pinions fixed to said shaft, a bevel gear meshed with each pinion and each bevel gear extending at least partially into the associated hopper bottom opening, a plurality of feed wheels disposed in alternate hopper openings and each having a shank connected with the associated bevel gear so as to be driven by the latter, a plurality of agitator drive studs disposed in the remaining hopper openings and each having a shank similar to a feed wheel shank and connected with the associated bevel gear so as to be driven by the latter, each drive stud and the next adjacent feed wheel having an agitator-receiving part, an agitator mounted on said parts, and a cover to close over the discharge opening associated with each of said agitator drive studs.

4. In a fertilizer distributor, an elongated hopper having a bottom formed by a plurality of bottom plates, each having a fertilizer discharge opening and a feed wheel receiving opening, a feed wheel disposed in alternate feed wheel openings, an agitator drive projection on each feed wheel, an agitator drive stud rotatably disposed in each of the other openings in said hopper bottom plates, means connected with said drive studs and said feed wheels for driving all of said drive studs and feed wheels simultaneously, each of said drive studs also having an agitator drive projection, a plurality of agitator bars, one for each of said drive studs, each agitator bar being connected with the associated drive stud and with the associated feed wheel, and a plurality of hold down springs, each connected to react at one end against the hopper and at the other end against the associated agitator bar, said other end of each of said springs having a portion encircling the associated agitator drive projection.

5. In a fertilizer distributor, an elongated hopper having a bottom formed by a plurality of bottom plates, each having a fertilizer discharge opening and a feed wheel receiving opening, a feed wheel disposed in alternate feed wheel openings, an agitator drive projection on each feed wheel, an agitator drive stud rotatably disposed in each of the other openings in said hopper bottom plates, means connected with said drive studs and said feed wheels for driving all of said drive studs and feed wheels simultaneously, each of said drive studs also having an agitator drive projection, a plurality of agitator bars, one for each of said drive studs, each agitator bar being connected with the associated drive stud and with the associated feed wheel, a plurality of hold down springs connected to react at one end against the hopper and at the other end against the associated agitator bar, said other end of each of said springs having a portion encircling the associated agitator drive projection, and a stop cover associated with each of said drive studs and mounted on the associated hopper bottom so as to close the discharge opening thereof.

6. In a fertilizer distributor, an elongated hopper having a bottom formed by a plurality of bottom plates, each having a fertilizer discharge opening and a feed wheel receiving opening, a feed wheel disposed in alternate feed wheel openings, an agitator drive projection on each feed wheel, an agitator drive stud rotatably disposed in each of the other openings in said hopper bottom plates, means connected with said drive studs and said feed wheels for driving all of said drive studs and feed wheels simultaneously, each of said drive studs also having an agitator drive projection, a plurality of agitator bars, one for each of said drive studs, each agitator bar being connected with the associated drive stud and with the associated feed wheel, a plurality of hold down springs connected to react at one end against the hopper and at the other end against the associated agitator bar, said other end of each of said springs having a portion encircling the associated agitator drive projection, a stop cover associated with each of said drive studs and mounted on the associated hopper bottom so as to close the discharge opening thereof, and each stop cover having an apertured portion surrounding said drive stud.

References Cited in the file of this patent

UNITED STATES PATENTS

| 1,151,742 | Van Brunt et al. | Aug. 31, 1915 |
| 1,330,275 | Osmundson | Feb. 10, 1920 |
| 2,368,127 | Fasick | Jan. 30, 1945 |

FOREIGN PATENTS

| 655,835 | Great Britain | Aug. 1, 1951 |